United States Patent
Araki et al.

(10) Patent No.: US 12,506,419 B2
(45) Date of Patent: Dec. 23, 2025

(54) POWER CONVERSION DEVICE

(71) Applicant: Hitachi Astemo, Ltd., Hitachinaka (JP)

(72) Inventors: Takahiro Araki, Tokyo (JP); Takeshi Tokuyama, Tokyo (JP); Akihiro Namba, Tokyo (JP); Shigehisa Aoyagi, Hitachinaka (JP); Noriyuki Maekawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 217 days.

(21) Appl. No.: 18/564,819

(22) PCT Filed: Mar. 2, 2022

(86) PCT No.: PCT/JP2022/008994
§ 371 (c)(1),
(2) Date: Nov. 28, 2023

(87) PCT Pub. No.: WO2023/286328
PCT Pub. Date: Jan. 19, 2023

(65) Prior Publication Data
US 2024/0275297 A1 Aug. 15, 2024

(30) Foreign Application Priority Data
Jul. 14, 2021 (JP) ................. 2021-116682

(51) Int. Cl.
*H02M 7/04* (2006.01)
*H02M 1/00* (2006.01)
(Continued)

(52) U.S. Cl.
CPC ......... *H02M 7/003* (2013.01); *H02M 1/0009* (2021.05); *H02M 1/44* (2013.01)

(58) Field of Classification Search
CPC ....... H02M 1/0009; H02M 1/44; H02M 7/003
See application file for complete search history.

(56) References Cited

U.S. PATENT DOCUMENTS

2011/0292617 A1* 12/2011 Darroman ............. H02M 7/003
                                                           361/728
2013/0335076 A1    12/2013 Sakamoto et al.
(Continued)

FOREIGN PATENT DOCUMENTS

JP    2005-300170 A    10/2005
JP    2005-321206 A    11/2005
(Continued)

OTHER PUBLICATIONS

Japanese-language Office Action issued in Japanese Application No. 2021-116682 dated Sep. 17, 2024 with English translation (12 pages).

(Continued)

*Primary Examiner* — Gary L Laxton
(74) *Attorney, Agent, or Firm* — Crowell & Moring LLP

(57) ABSTRACT

A power conversion device includes: an inverter circuit; an AC conductor; a magnetic sensor that t detects magnetism generated when an AC current flows; a first magnetic body and a second magnetic body that face each other with the AC conductor and the magnetic sensor interposed therebetween; and a first housing and a second housing that are formed by conductive members. The first housing covers one opening of a space located between the first magnetic body and the second magnetic body, the second housing covers the other opening of the space. The end of each of the first magnetic body and the second magnetic body is formed so that the distance to the first housing or the second housing is smaller than the thickness of each of the first magnetic body and the second magnetic body in the arraying direction thereof.

7 Claims, 12 Drawing Sheets

(51) Int. Cl.
    *H02M 1/44*     (2007.01)
    *H02M 7/00*     (2006.01)

(56) References Cited

U.S. PATENT DOCUMENTS

| | | | | |
|---|---|---|---|---|
| 2014/0184212 | A1* | 7/2014 | Yamaguchi | G01R 15/207 |
| | | | | 324/244 |
| 2015/0173238 | A1* | 6/2015 | Nakanishi | H05K 7/20927 |
| | | | | 29/830 |
| 2018/0206359 | A1* | 7/2018 | McPherson | H05K 5/0069 |

FOREIGN PATENT DOCUMENTS

| | | |
|---|---|---|
| JP | 2013-257294 A | 12/2013 |
| JP | 2014-121105 A | 6/2014 |
| JP | 2014-219221 A | 11/2014 |
| JP | 2015-49184 A | 3/2015 |
| JP | 2019-184355 A | 10/2019 |
| JP | 2019-221048 A | 12/2019 |
| WO | WO 2019/082364 A1 | 5/2019 |

OTHER PUBLICATIONS

International Search Report (PCT/ISA/210) issued in PCT Application No. PCT/JP2022/008994 dated April 19, 2022 with English translation (4 pages).
Japanese-language Written Opinion (PCT/ISA/237) issued in PCT Application No. PCT/JP2022/008994 dated April 19, 2022 with English translation (5 pages).

* cited by examiner

POWER CONVERSION DEVICE

TECHNICAL FIELD

The present invention relates to a power conversion device.

BACKGROUND ART

As a background art of the present invention, the following PTL 1 discloses a coreless current measuring device in which side surfaces and a lower surface of a magnetic sensor are shielded by a magnetic body so that a response delay of current detection does not occur even in a case where magnetic noise is applied from the outside of a magnetic shield.

CITATION LIST

Patent Literature

PTL 1: JP 2019-184355 A

SUMMARY OF INVENTION

Technical Problem

In view of the configuration described in PTL 1, an object of the present invention is to provide a power conversion device that achieves both reduction in thickness and suppression of magnetic interference in order to achieve a similar effect even with a thin power conversion device structure in order to meet further customer requirements.

Solution to Problem

A power conversion device includes: an inverter circuit that converts a DC current into an AC current; an AC conductor that transmits the AC current; a magnetic sensor that detects magnetism generated when the AC current flows through the AC conductor; a first magnetic body and a second magnetic body that face each other with the AC conductor and the magnetic sensor interposed therebetween; and a first housing and a second housing that are formed by conductive members. The first housing covers one opening of a space located between the first magnetic body and the second magnetic body. The second housing covers the other opening of the space. The end of each of the first magnetic body and the second magnetic body is formed so that the distance to the first housing or the second housing is smaller than the thickness of each of the first magnetic body and the second magnetic body in the arraying direction of the first magnetic body and the second magnetic body.

Advantageous Effects of Invention

According to the present invention, it is possible to provide a power conversion device that achieves both reduction in thickness and suppression of magnetic interference.

Figure 1A:
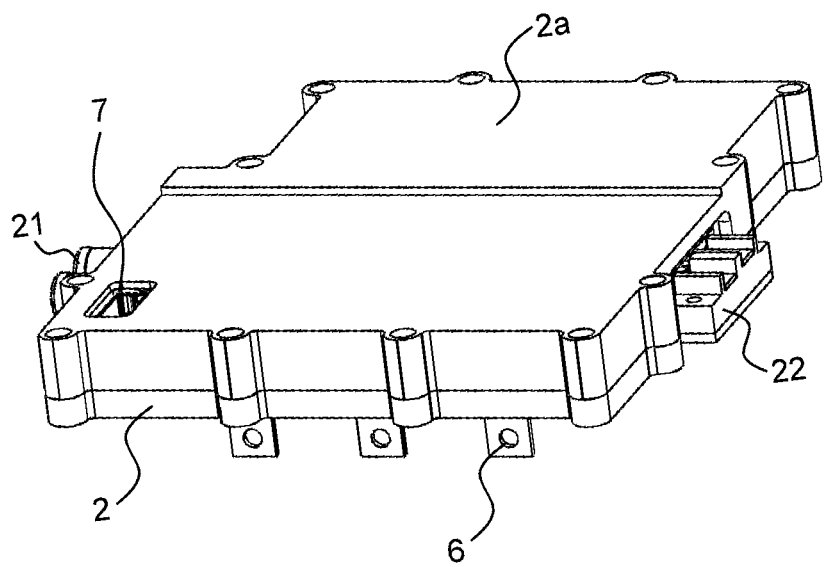
FIGS. 1A and 1B are external perspective views of a power conversion device according to an embodiment of the present invention and an internal view of a housing of the power conversion device from which a housing cover is removed.

Hereinafter, embodiments of the present invention will be described in detail with reference to the drawings. The following description and drawings are examples for describing the present invention, and are omitted and simplified as appropriate for the sake of clarity of description. The present invention can be carried out in various other forms. Unless otherwise specified, each component may be singular or plural.

Positions, sizes, shapes, ranges, and the like of the components illustrated in the drawings may not represent actual positions, sizes, shapes, ranges, and the like in order to facilitate understanding of the invention. Therefore, the present invention is not necessarily limited to the positions, sizes, shapes, ranges, and the like disclosed in the drawings.

First Embodiment and Configuration of Power Conversion Device

Figure 1B:
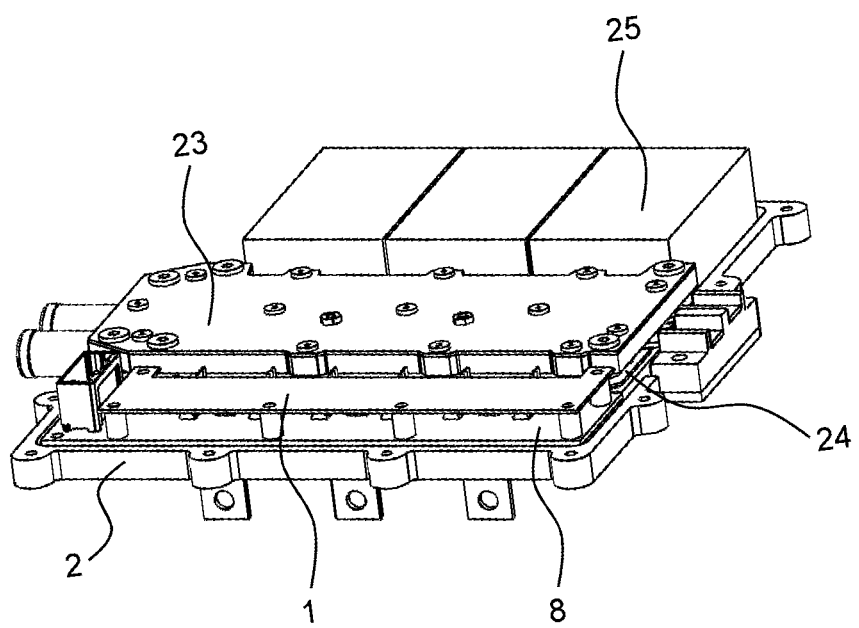

FIG. 1 is an external perspective view of a power conversion device according to an embodiment of the present invention and an internal view of a housing of the power conversion device from which a housing cover is removed.

A housing 2a of the power conversion device includes a DC input terminal 22 that supplies a DC current to an inverter circuit housed in the housing 2a, AC conductors 6 that output an AC current from an inverter to the outside, a refrigerant inflow port 21 that supplies a refrigerant for cooling the inverter circuit to the inside of the housing 2a, and a control signal input/output terminal 7 that transmits a control signal of the inverter circuit to an external control device. A housing 2 at the bottom (base) of the housing 2a is a conductive member. The inside is sealed by being covered with the housing 2a so that foreign matter and water is prevented from entering from the outside.

Inside the housing 2a, a capacitor 25 that smooths an input current input from the DC input terminal 22, a main circuit unit 24 that converts a DC current into an AC current, refrigerant flow paths 23 that cool the main circuit unit 24, a magnetism detection substrate 8 that detects a magnetic flux generated by the AC conductor 6, and a first housing 1 formed to cover the magnetism detection substrate 8 are housed. The first housing 1 is a conductive member. The magnetism detection substrate 8 includes three magnetic sensors 5 (see FIG. 3) corresponding to the three-phase AC conductors 6, and is fixed to the second housing 2 by screwing or the like.

Figure 2A:
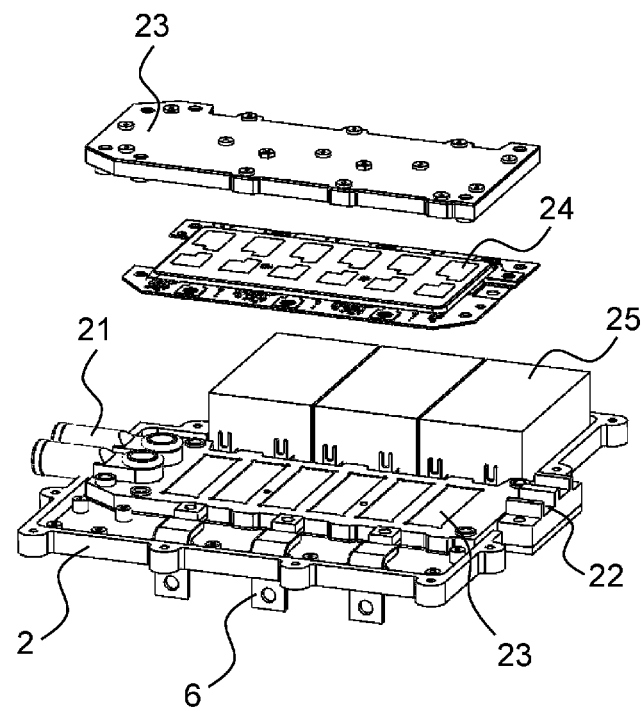
FIGS. 2A and 2B are exploded perspective views and a block diagram of the power conversion device according to an embodiment of the present invention.
Figure 2B:
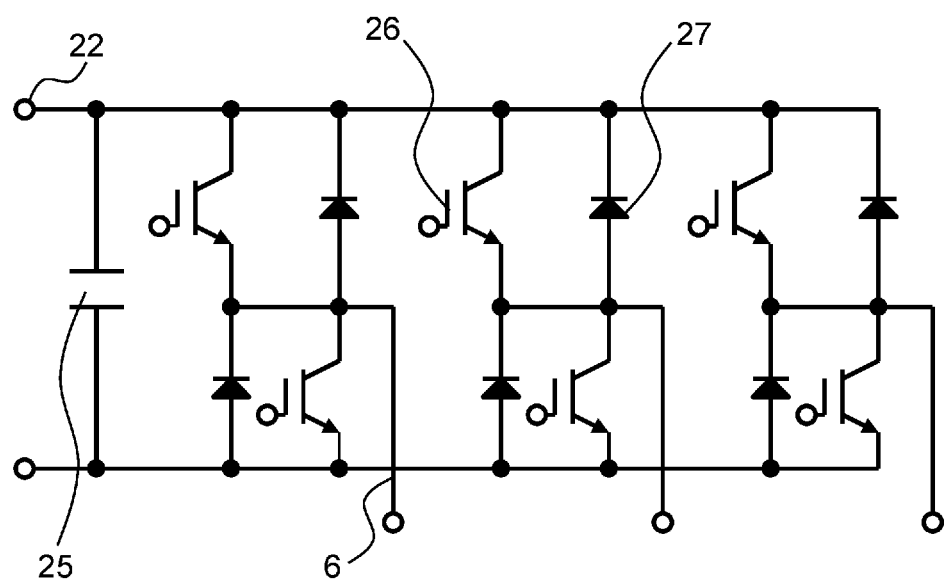

FIG. 2 is an exploded perspective view and a block diagram of the power conversion device according to an embodiment of the present invention.

The main circuit unit 24 of the inverter circuit includes the DC input terminal 22, the capacitor 25, an IGBT element 26, a diode element 27, and the AC conductors 6. The capacitor 25 is connected in parallel with the positive electrode and the negative electrode of the DC input terminal 22. A portion functioning as a switching element by connecting the IGBT element 26 and the diode element 27 in series is connected in parallel with the capacitor 25 to constitute a half bridge circuit. The IGBT element 26 is turned on or off based on a signal of a control circuit, not illustrated, to convert a DC current into an AC current.

The refrigerant flow paths 23 are provided on upper and lower main surfaces of the main circuit unit 24. A refrigerant such as a long life coolant supplied from the outside through the refrigerant inflow port 21 flows inside the refrigerant flow path 23. A fin is formed inside the refrigerant flow path 23 in order to improve cooling performance. The main circuit unit 24 is sealed with an insulating resin for insulation from the refrigerant flow paths 23 and the second housing 2.

By applying heat dissipating grease or the like to the heat dissipating surface of the main circuit unit 24 in contact with the refrigerant flow path 23, adhesion to the refrigerant flow path 23 is enhanced, and contact thermal resistance is reduced. The main circuit unit 24 is configured by mounting the IGBT element 26 and the diode element 27 on a wiring material such as a printed circuit board.

The main circuit unit 24 and the capacitor 25 are electrically connected by a bonding material such as solder. The AC conductor 6 is electrically connected to the main circuit unit 24 by screw fastening, solder bonding, or the like.

Figure 3A:
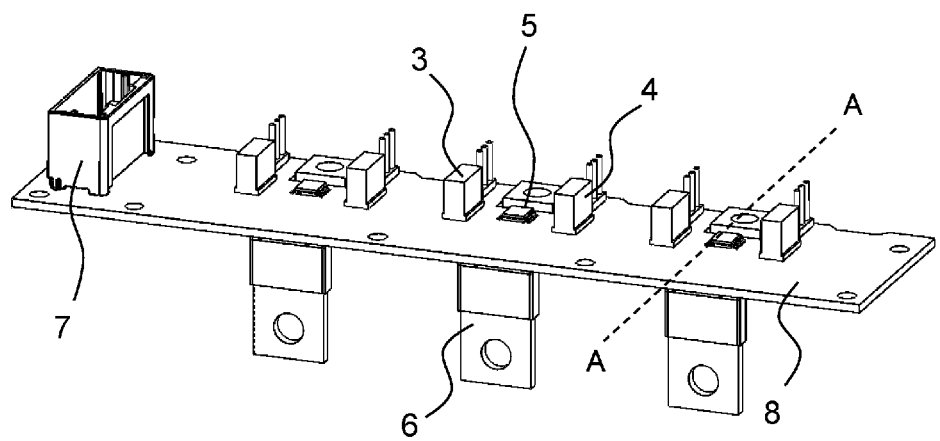
FIGS. 3A and 3B are perspective views and an A-A cross-sectional view of a magnetic sensor peripheral portion according to a first embodiment of the present invention.

FIG. 3 is a perspective view and an A-A cross-sectional view of a magnetic sensor peripheral portion according to a first embodiment of the present invention.

An output signal of the magnetic sensor 5 is transmitted from the control signal input/output terminal 7 to an inverter control circuit, not illustrated, outside the housing 2a via wiring of the magnetism detection substrate 8. In addition to the magnetic sensors 5, a power supply circuit that supplies power to the magnetic sensors 5 and the like are mounted on the magnetism detection substrate 8. The AC conductor 6 passes through the lower surface of the magnetic sensor 5 and then protrudes in the direction of the lower surface of the first housing 1, thereby suppressing the magnetic flux of a motor current from interfering with electronic components other than the magnetic sensor 5.

Each of the first magnetic body 3 and the second magnetic body 4 is formed to be longer than the magnetic sensor 5 in the horizontal direction in the drawing. This makes it possible to suppress the magnetic flux flowing around from the left and right side surfaces of the first magnetic body 3 and the second magnetic body 4.

Figure 3B:
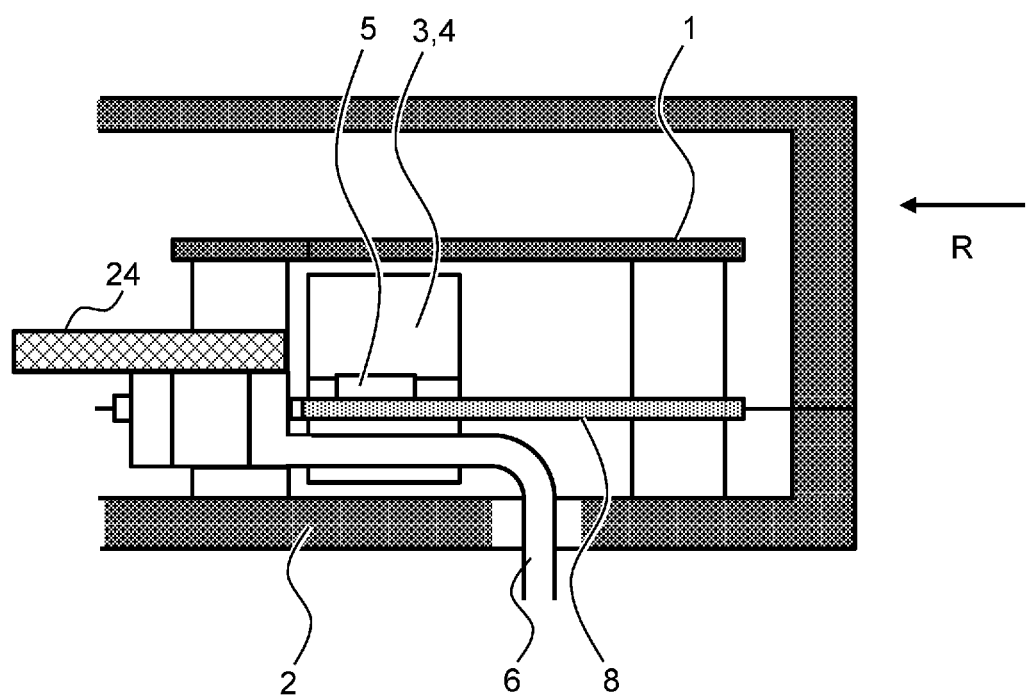
Figure 4:
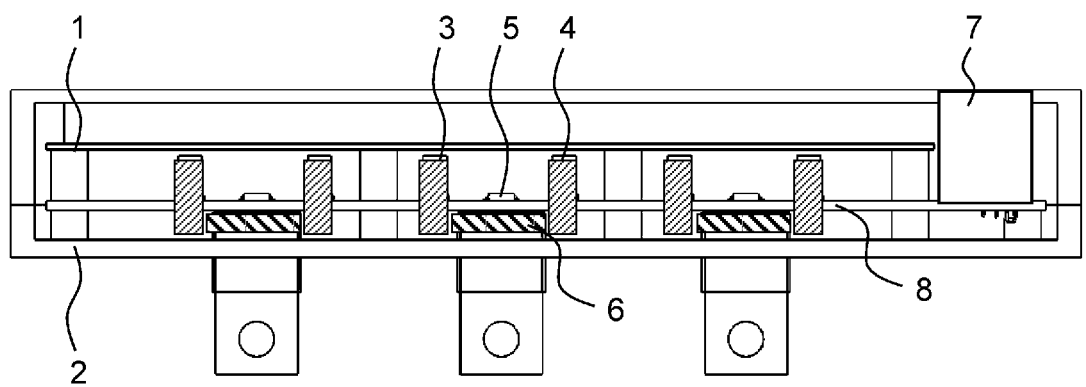
FIG. 4 is a cross-sectional view of FIG. 3(b) as viewed from the R direction.

FIG. 4 is a cross-sectional view of FIG. 3(b) as viewed from the R direction.

The first magnetic body 3 and the second magnetic body 4 are constructed by electromagnetic steel plates, ferrite cores, or the like, and are disposed at positions facing each other with the AC conductor (wiring) 6 and the magnetic sensor 5 interposed therebetween. The first housing 1 covers one opening of a space located between the first magnetic body 3 and the second magnetic body 4, and the second housing 2 covers the other opening. As a result, it is possible to collect the magnetic flux spreading to the right and left among the magnetic fluxes generated when a current flows through the AC conductor 6 to suppress leakage of the magnetic flux to the surroundings. The first magnetic body 3 and the second magnetic body 4 are fixed to through holes, not illustrated, provided in the magnetism detection substrate 8. The positions of the magnetic bodies 3 and 4 are determined line-symmetrically from the centers of the magnetic sensor 5 and the AC conductor 6 by the through holes.

The plurality of magnetic sensors 5 is disposed on the magnetism detection substrate 8 in the arraying direction of the first magnetic body 3 and the second magnetic body 4, and are disposed above the AC conductors 6 of the corresponding phases, respectively, in order to detect the magnetic flux generated by currents of the respective phases flowing through the AC conductors 6. The magnetic sensor 5 reduces interference of external magnetic flux by detecting magnetic flux in the horizontal direction in the drawing. In addition, the magnetic sensor 5 can increase the detection sensitivity of magnetic flux by being close to the AC conductor 6.

Figure 5:
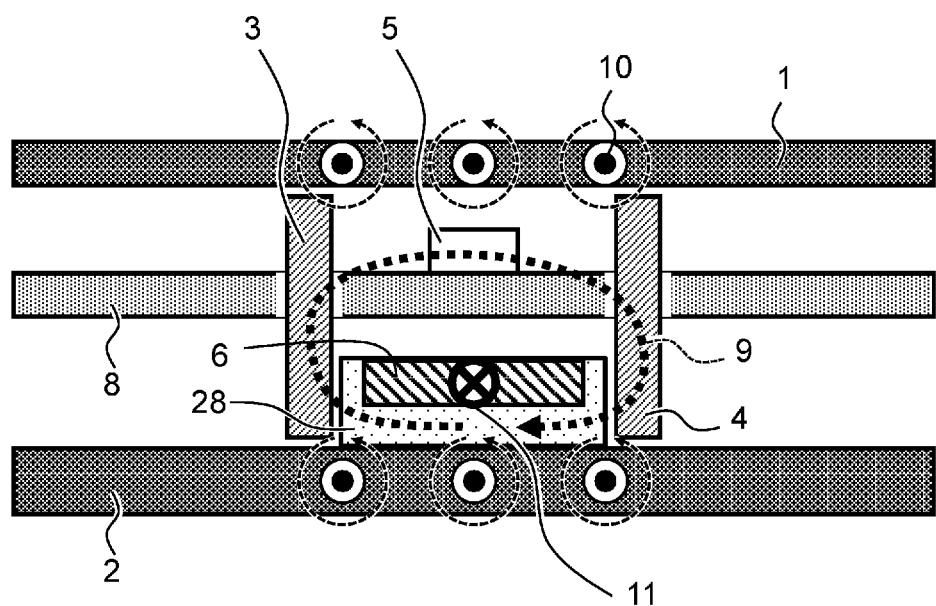
FIG. 5 is a cross-sectional view of the magnetic sensor peripheral portion according to the first embodiment of the present invention.

FIG. 5 is a cross-sectional view of the magnetic sensor peripheral portion according to the first embodiment of the present invention.

The first housing 1 and the second housing 2 are constructed by nonmagnetic conductors such as aluminum, and are disposed so as to cover opening portions of the space located between the first magnetic body 3 and the second magnetic body 4. As a result, magnetic flux 9 generated when a motor current 11 flows through the AC conductor 6 generates an induced current 10 in the first housing 1 and the second housing 2, and the magnetic flux caused by the induced current 10 blocks the magnetic flux 9 caused by the motor current 11. In this way, the magnetic bodies 3 and 4 are disposed between the AC conductors 6 of the respective phases and only on the sides of the magnetic sensor 5, and no magnetic shield is provided in the height direction (vertical direction in the drawing), which contributes to reduction in thickness and suppresses the magnetic flux leakage from this space to another phase.

With this structure, it is possible to suppress the magnetic flux 9 of the motor current 11 flowing through the AC conductor 6 from interfering with the magnetic sensor 5 of another phase and a surrounding circuit without providing additional magnetic bodies on the upper surface of the magnetic sensor 5 and the lower surface of the AC conductor 6. This achieves both reduction in thickness and improvement in current detection accuracy of the power conversion device. Furthermore, in the present structure, since the magnetic bodies 3 and 4 and the housings 1 and 2 that suppress leakage of the magnetic flux 9 are divided, assemblability is improved.

The first housing 1 is disposed so as to cover the magnetism detection substrate 8, serves as a target to which a control board, not illustrated, is fixed when the control board is disposed on the upper portion, and stabilizes the potential of the control circuit by forming a case potential surface widely on the lower surface of the control board.

The AC conductor 6 is constructed by a conductor such as copper, and is electrically connected to the output terminal of a power module and a motor by welding or screwing. In addition, the AC conductor 6 is fixed to the second housing 2 via an insulating material 28. Therefore, the relative positions of the AC conductor 6, the magnetic bodies 3 and 4, and the magnetic sensor 5 are determined by the second housing 2 and the magnetism detection substrate 8.

Figure 6:
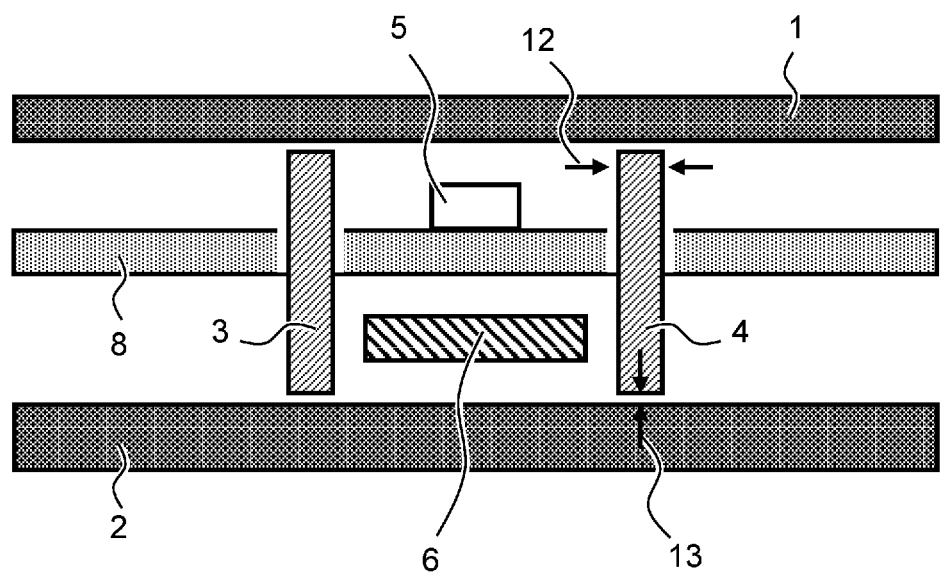
FIG. 6 is an explanatory view regarding a distance between a housing and a magnetic body according to the first embodiment of the present invention.

FIG. 6 is an explanatory view regarding the distance between the housing and the magnetic body according to the first embodiment of the present invention.

A thickness 12 of each of the first magnetic body 3 and the second magnetic body 4 in the arraying direction thereof refers to a thickness of a portion (end of the magnetic body) where the first magnetic body 3 or the second magnetic body 4 comes closest to the first housing 1 or the second housing 2. A distance 13 from an end of each of the first magnetic body 3 and the second magnetic body 4 to the first housing 1 or the second housing 2 refers to the shortest distance between the first magnetic body 3 or the second magnetic body 4 and the first housing 1 or the second housing 2. The magnetic bodies 3 and 4 are disposed such that the distance 13 is smaller than the thickness 12 of the end of each of the magnetic bodies 3 and 4. As long as this condition can be achieved, the shapes of the central portions of the magnetic bodies 3 and 4 are not limited, and for example, the shapes may be such that the central portions of the magnetic bodies 3 and 4 are constricted. In addition, the magnetic bodies 3 and 4 and the housings 1 and 2 may be in contact with each other.

Second Embodiment

Figure 7:
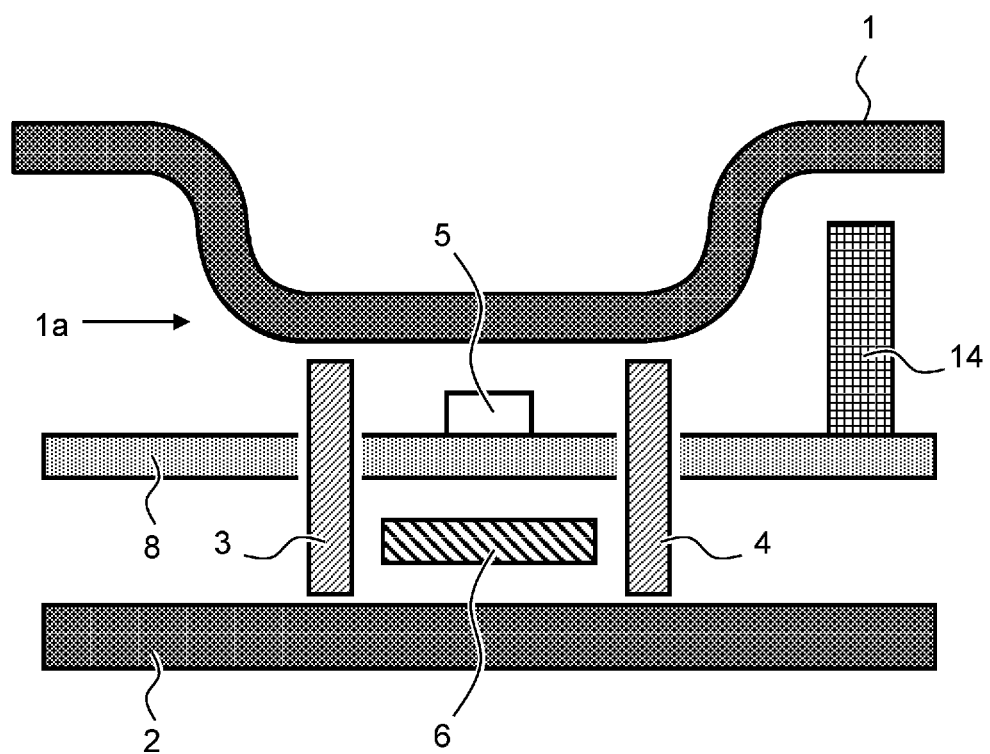
FIG. 7 is a cross-sectional view of a magnetic sensor peripheral portion according to a second embodiment of the present invention.

FIG. 7 is a cross-sectional view of a magnetic sensor peripheral portion according to a second embodiment of the present invention.

A first housing 1 is has a protrusion 1a provided on a surface facing a second housing 2 and above a magnetic sensor 5, a first magnetic body 3, a second magnetic body 4, and an AC conductor 6, while securing a space for the installation place of an electronic component 14. In the first housing 1, ends of the first magnetic body 3 and the second magnetic body 4 are close to the first housing 1 due to the protrusion 1a. As a result, in a case where the electronic component 14 larger than the magnetic sensor 5 is mounted on a magnetism detection substrate 8, it is not necessary to increase the sizes of the first magnetic body 3 and the second magnetic body 4. In addition, the first magnetic body 3 and the second magnetic body 4 are disposed such that the distance to the first housing 1 or the second housing 2 is smaller than the thickness 12 of each of the first magnetic body 3 and the second magnetic body 4 in the arraying direction thereof described above.

Third Embodiment

Figure 8:
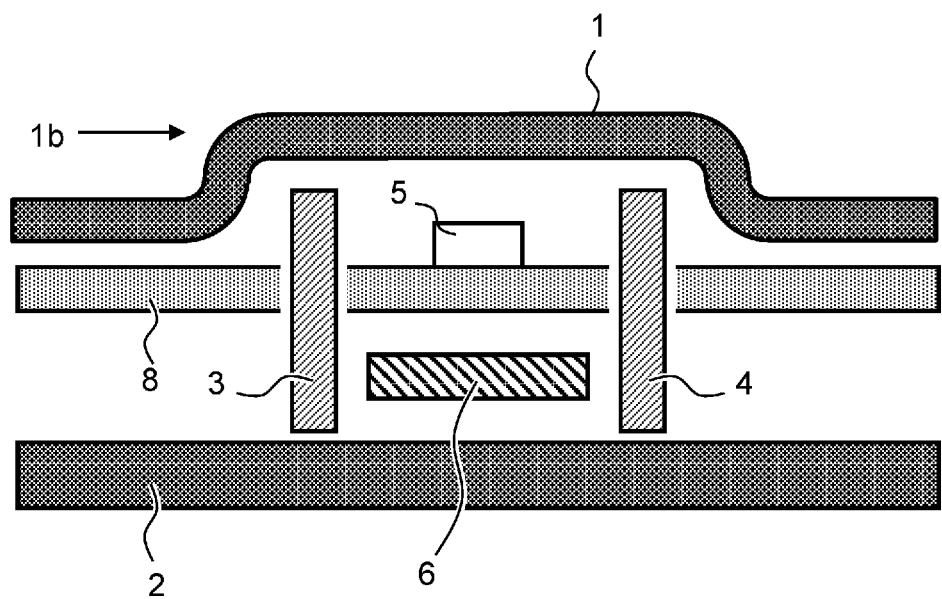
FIG. 8 is a cross-sectional view of a magnetic sensor peripheral portion according to a third embodiment of the present invention.

FIG. 8 is a cross-sectional view of a magnetic sensor peripheral portion according to a third embodiment of the present invention.

A first housing 1 has a recess 1b in the external direction above a magnetic sensor 5, a first magnetic body 3, a second magnetic body 4, and an AC conductor 6. Since the side surfaces of the first magnetic body 3 and the second magnetic body 4 are covered by the first housing 1 due to the recess 1b, it is possible to suppress magnetic flux leaking laterally (in the horizontal direction in the drawing) from the gaps between the first magnetic body 3 and the first housing 1 and between the second magnetic body 4 and the first housing 1.

Fourth Embodiment

Figure 9:
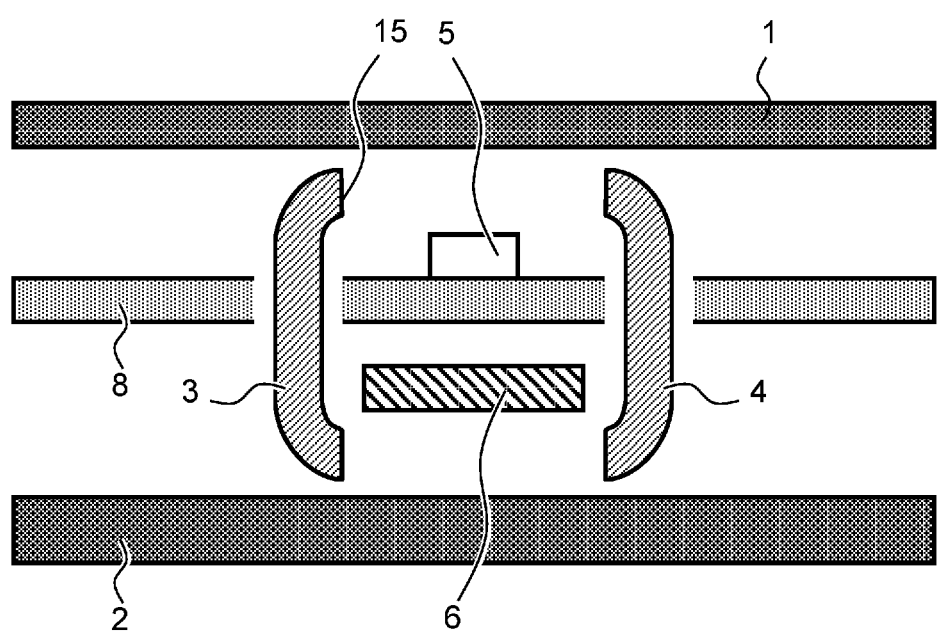
FIG. 9 is a cross-sectional view of a magnetic sensor peripheral portion according to a fourth embodiment of the present invention.

FIG. 9 is a cross-sectional view of a magnetic sensor peripheral portion according to a fourth embodiment of the present invention.

A first magnetic body 3 and a second magnetic body 4 have magnetic body protrusions 15 on surfaces thereof facing each other. The magnetic body protrusions 15 are formed such that extension lines of the protrusion portions are formed closer to the first housing 1 and the second housing 2 than the upper surface of a magnetic sensor 5 and the lower surface of an AC conductor 6. As described above, by providing the protrusions 15 on the facing surfaces of the first magnetic body 3 and the second magnetic body 4, the magnetic flux of a motor current flowing through the AC conductor 6 is guided to the magnetic body protrusions 15, and the magnetic flux leaking from the space located between the magnetic body protrusions 15 of the first magnetic body 3 and the second magnetic body 4 or the opening portions of the space to the surroundings is suppressed.

Fifth Embodiment

Figure 10:
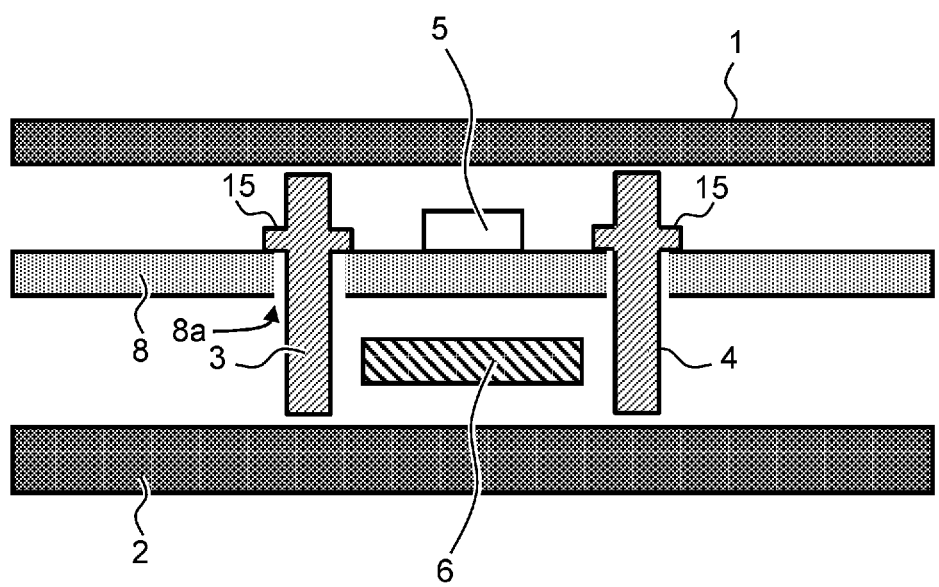
FIG. 10 is a cross-sectional view of a magnetic sensor peripheral portion according to a fifth embodiment of the present invention.

FIG. 10 is a cross-sectional view of a magnetic sensor peripheral portion according to a fifth embodiment of the present invention.

A first magnetic body 3 and a second magnetic body 4 have magnetic body protrusions 15, and are fixed to a magnetism detection substrate 8 by the magnetic body protrusions 15, so that the height positions are determined. As a result, the relative positions of the first magnetic body 3, the second magnetic body 4, and the magnetic sensor 5 can be accurately determined.

Note that, as a fixing method, the magnetic bodies 3 and 4 can be fixed to the magnetism detection substrate 8 by attaching an adhesive to the protrusions 15 of the first magnetic body 3 and the second magnetic body 4. In addition, potential of the first magnetic body 3 and the second magnetic body 4 can be determined by disposing housing potential wiring, not illustrated, around through holes 8a provided in the magnetism detection substrate 8 in order to insert the first magnetic body 3 and the second magnetic body 4 therethrough, and soldering the first magnetic body 3 and the second magnetic body 4 to the housing potential wiring.

Sixth Embodiment

Figure 11:
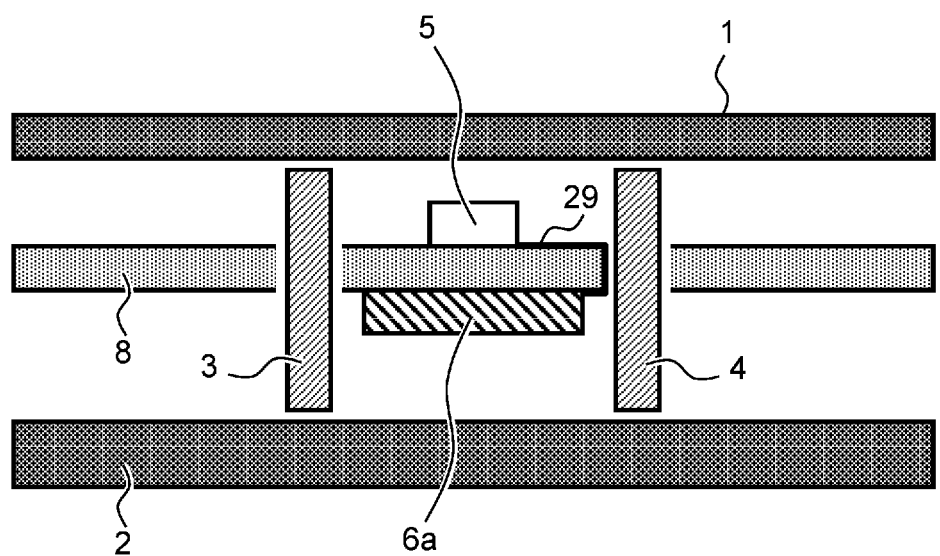
FIG. 11 is a cross-sectional view of a magnetic sensor peripheral portion according to a sixth embodiment of the present invention.

FIG. 11 is a cross-sectional view of a magnetic sensor peripheral portion according to a sixth embodiment of the present invention.

In the present embodiment, AC wiring 6a is provided on a magnetism detection substrate 8 instead of the AC conductor 6 described above, and a motor current 11 flows through the AC wiring 6a. At this time, in the magnetism detection substrate 8, by providing the AC wiring 6a on the surface opposite to the surface on which a magnetic sensor 5 is mounted, the magnetic sensor 5 and the AC wiring 6a can be brought close to each other while securing a creepage distance 29 necessary for insulating the magnetic sensor 5 and the AC wiring 6a from each other. This improves the sensitivity with which the magnetic sensor 5 detects magnetic flux. Furthermore, since the positions of the AC wiring 6a and the magnetic sensor 5 are accurately determined, the detection accuracy of the magnetic sensor 5 is improved.

Seventh Embodiment

Figure 12:
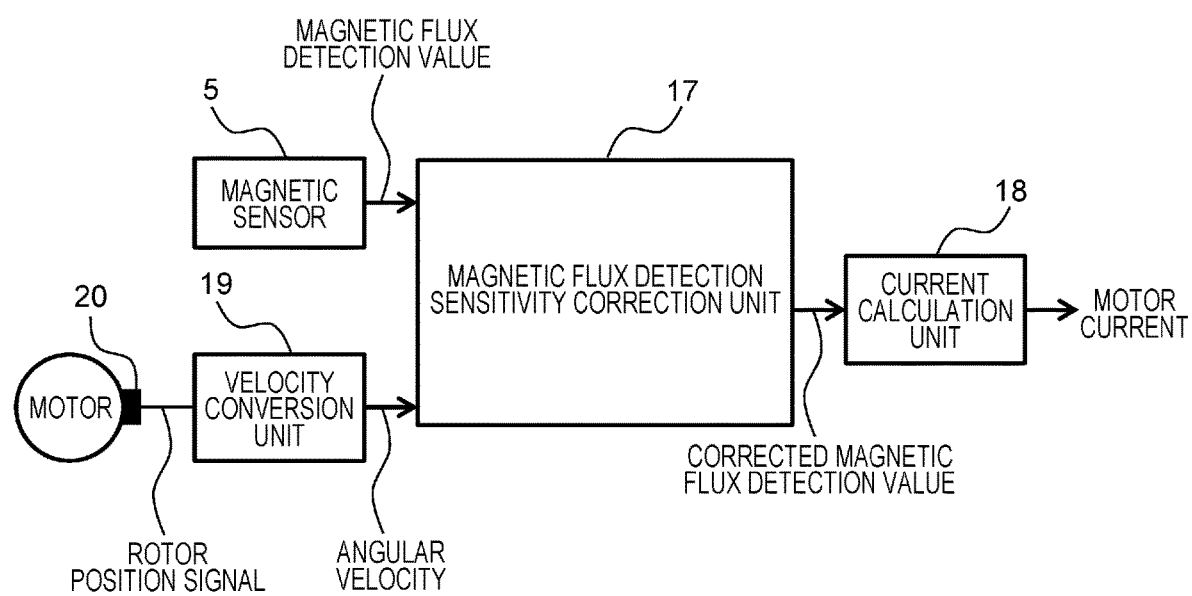
FIG. 12 is a diagram regarding a magnetism detection sensitivity correction unit according to a seventh embodiment of the present invention.

FIG. 12 is a diagram regarding a magnetism detection sensitivity correction unit according to a seventh embodiment of the present invention.

A magnetic sensor 5 detects the magnetic flux of a motor current flowing through an AC conductor 6, and outputs a magnetic flux detection value to a magnetic flux detection sensitivity correction unit 17. An angle sensor 20 is connected to a rotor of a motor, and outputs a rotor position signal to a velocity conversion unit 19. The velocity conversion unit 19 calculates the angular velocity of the rotor of the motor for the magnetic flux detection sensitivity correction unit 17 based on the rotor position signal input from the angle sensor 20. This angular velocity corresponds to the frequency of the motor current flowing through the AC conductor 6. Note that the magnetic flux detection sensitivity correction unit 17 and the velocity conversion unit 19 are mounted on a control unit, not illustrated, provided outside a housing and connected to the control signal input/output terminal of FIG. 1.

The relationship between the angular velocity of the rotor of the motor and the magnetic flux detection sensitivity in the magnetic sensor 5 is set in advance in the magnetic flux detection sensitivity correction unit 17. Based on this relationship, the corrected magnetic flux detection value is calculated using the magnetic flux detection value input from the magnetic sensor 5 and the angular velocity input from the velocity conversion unit 19, and is output to a current calculation unit 18. The current calculation unit 18 calculates the motor current from the input corrected magnetic flux detection value based on the relationship between the magnetic flux detection value and the motor current set in advance. Note that the current calculation unit 18 is mounted on the control unit, not illustrated, provided outside the housing and connected to the control signal input/output terminal of FIG. 1.

As a result, it is possible to correct a change in magnetic flux detection sensitivity of the magnetic sensor 5 that changes due to an induced current 10 generated in a first housing 1 and a second housing 2, and to improve detection accuracy of the motor current.

According to the first to seventh embodiments of the present invention described above, the following operational effects are achieved.

(1) A power conversion device includes: an inverter circuit that converts a DC current into an AC current; an AC conductor 6 that transmits the AC current; a magnetic sensor 5 that detects magnetism generated when the AC current flows through the AC conductor; a first magnetic body 3 and a second magnetic body 4 that face each other with the AC conductor 6 and the magnetic sensor 5 interposed therebetween; and a first housing 1 and a second housing 2 that are formed by conductive members. The first housing 1 covers one opening of a space located between the first magnetic body 3 and the second magnetic body 4, and the second housing 2 covers the other opening of the space. The end of each of the first magnetic body 3 and the second magnetic body 4 is formed so that the distance to the first housing 1 or the second housing 2 is smaller than the thickness of each of the first magnetic body 3 and the second magnetic body 4 in the arraying direction of the first magnetic body 3 and the second magnetic body 4. With this configuration, it is possible to provide a power conversion device that achieves both reduction in thickness and suppression of magnetic interference.

(2) The first housing 1 has a protrusion 1a formed on a surface facing the second housing 2 so as to protrude toward the second housing 2, and the magnetic sensor 5, the first magnetic body 1, the second magnetic body 2, and the AC conductor 6 are disposed between the protrusion 1a and the second housing 2. With this configuration, in a case where an electronic component larger than the magnetic sensor 5 is mounted, it is not necessary to increase the sizes of the first magnetic body 3 and the second magnetic body 4.

(3) The first housing 1 has a recess 1b formed on the surface facing the second housing 2 so as to be recessed in the direction away from the second housing 2, and the magnetic sensor 5, the first magnetic body, the second magnetic body, and the AC conductor 6 are disposed between the recess 1b and the second housing 2. With this configuration, it is possible to suppress magnetic flux leaking laterally (in the horizontal direction in the drawing) from gaps between the first magnetic body 3 and the first housing 1 and between the second magnetic body 4 and the first housing 1.

(4) The first magnetic body 3 and the second magnetic body 4 have magnetic body protrusions 15 that face each other, and extension lines of protrusion portions of the magnetic body protrusions 15 are formed closer to the first housing 1 and the second housing 2 than the upper surface of the magnetic sensor 5 and the lower surface of the AC conductor 6. With this configuration, the magnetic flux of a motor current flowing through the AC conductor 6 is guided to the magnetic body protrusions 15, and the magnetic flux leaking from the space located between the magnetic body protrusions 15 of the first magnetic body 3 and the second magnetic body 4 or an opening portion of the space to the surroundings is suppressed.

(5) A magnetism detection substrate 8 on which the magnetic sensor 5 is disposed is provided, the first magnetic body 3 and the second magnetic body 4 have magnetic body protrusions 1a, and the magnetic body protrusions 1a fix the first magnetic body 3 and the second magnetic body 4 to the magnetism detection substrate 8. With this configuration, the relative positions of the first magnetic body 3, the second magnetic body 4, and the magnetic sensor 5 can be accurately determined, and the potentials of the first magnetic body 3 and the second magnetic body 4 can be determined.

(6) A magnetism detection substrate 8 on which the magnetic sensor 5 is disposed is provided, the AC conductor 6 is constituted by wiring provided on the magnetism detection substrate 8, and the magnetic sensor 5 is disposed on a surface of the magnetism detection substrate 8 on which the AC conductor 6 is not disposed. With this configuration, the magnetic sensor 5 and an AC wiring 6a can be brought close to each other while securing a creepage distance necessary for insulating the magnetic sensor 5 and the AC wiring 6a from each other and the sensitivity with which the magnetic sensor 5 detects magnetic flux is improved. Furthermore, since the positions of the AC wiring 6a and the magnetic sensor 5 are accurately determined, the detection accuracy of the magnetic sensor 5 is improved.

(7) A velocity conversion unit 19 that converts a rotor position signal output from an angle sensor 20 connected to a rotor of a motor into an angular velocity, and a magnetic flux detection sensitivity correction unit 17 that corrects a magnetic flux detection value output from the magnetic sensor 5 are provided, and the magnetic flux detection sensitivity correction unit 17 corrects the magnetic flux detection value based on the magnetic flux detection value output from the magnetic sensor 5, an angular velocity output from the velocity conversion unit 19, and a relationship between an angular velocity and a magnetic flux detection sensitivity set in advance. With this configuration, it is possible to correct a change in magnetic flux detection sensitivity of the magnetic sensor 5 that changes due to an induced current 10 generated in the first housing 1 and the second housing 2, and to improve detection accuracy of a motor current.

Note that the present invention is not limited to the above embodiments, and various modifications and other configurations can be combined without departing from the gist of the present invention. In addition, the present invention is not limited to one including all the configurations described in the above embodiments, and includes one in which part of the configuration is deleted.

REFERENCE SIGNS LIST 1 first housing
1a protrusion
1b recess
2 second housing (base portion)
2a inverter housing (whole)
3 first magnetic body
4 second magnetic body
5 magnetic sensor
6 AC conductor
6a AC conductor wiring
7 control signal input/output terminal
8 magnetism detection substrate
8a through hole
9 magnetic flux
10 induced current
11 motor current
12 thickness in arraying direction
13 distance between magnetic body end and housing
14 electronic component
15 magnetic body protrusion
17 magnetic flux detection sensitivity correction unit
18 current calculation unit
19 velocity conversion unit
20 angle sensor
21 refrigerant inflow port
22 DC input terminal
23 refrigerant flow path
24 main circuit unit
25 capacitor
26 IGBT element
27 diode element
28 insulating material
29 creepage distance

The invention claimed is:

1. A power conversion device comprising:
an inverter circuit that converts a DC current into an AC current;
an AC conductor that transmits the AC current;
a magnetic sensor that detects magnetism generated when the AC current flows through the AC conductor;
a first magnetic body and a second magnetic body that face each other with the AC conductor and the magnetic sensor interposed therebetween; and
a first housing and a second housing that are formed by conductive members,
the first housing covering one opening of a space located between the first magnetic body and the second magnetic body,
the second housing covering another opening of the space,
an end of each of the first magnetic body and the second magnetic body being formed so that a distance to the first housing or the second housing is smaller than a thickness of each of the first magnetic body and the second magnetic body in an arraying direction of the first magnetic body and the second magnetic body.

2. The power conversion device according to claim 1,
wherein the first housing has a protrusion formed on a surface facing the second housing so as to protrude toward the second housing, and
the magnetic sensor, the first magnetic body, the second magnetic body, and the AC conductor are disposed between the protrusion and the second housing.

3. The power conversion device according to claim 1,
wherein the first housing has a recess formed on a surface facing the second housing so as to be recessed in a direction away from the second housing, and
the magnetic sensor, the first magnetic body, the second magnetic body, and the AC conductor are disposed between the recess and the second housing.

4. The power conversion device according to claim 1,
wherein the first magnetic body and the second magnetic body have magnetic body protrusions that face each other,
extension lines of protrusion portions of the magnetic body protrusions are formed closer to the first housing and the second housing than an upper surface of the magnetic sensor and a lower surface of the AC conductor.

5. The power conversion device according to claim 1 further comprising a magnetism detection substrate on which the magnetic sensor is disposed,
wherein the first magnetic body and the second magnetic body have magnetic body protrusions, and
the magnetic body protrusions fix the first magnetic body and the second magnetic body to the magnetism detection substrate.

6. The power conversion device according to claim 1 further comprising a magnetism detection substrate on which the magnetic sensor is disposed,
wherein the AC conductor is constituted by wiring provided on the magnetism detection substrate, and
the magnetic sensor is disposed on a surface of the magnetism detection substrate on which the AC conductor is not disposed.

7. The power conversion device according to claim 1 further comprising:
a velocity conversion unit that converts a rotor position signal output from an angle sensor connected to a rotor of a motor into an angular velocity; and
a magnetic flux detection sensitivity correction unit that corrects a magnetic flux detection value output from the magnetic sensor,
wherein the magnetic flux detection sensitivity correction unit corrects the magnetic flux detection value based on the magnetic flux detection value output from the magnetic sensor, an angular velocity output from the velocity conversion unit, and a relationship between an angular velocity and a magnetic flux detection sensitivity set in advance.

* * * * *